United States Patent
Kroger et al.

(10) Patent No.: US 10,160,579 B2
(45) Date of Patent: Dec. 25, 2018

(54) SEALING DISK FOR A CLOSURE CAP FOR CONTAINERS, ESPECIALLY BOTTLES

(71) Applicant: Alfelder Kunststoffwerke Herm. Meyer GmbH, Alfeld/Leine (DE)

(72) Inventors: Rainer Kroger, Sehnde (DE); Heinz-Werner Rohrka, Geisenheim (DE); Peter Rothweiler, Freden an der Leine (DE)

(73) Assignee: Alfelder Kunststoffwerke Herm. Meyer GmbH (DE)

( * ) Notice: Subject to any disclaimer, the term of this patent is extended or adjusted under 35 U.S.C. 154(b) by 0 days.

(21) Appl. No.: 14/902,111

(22) PCT Filed: Jul. 1, 2014

(86) PCT No.: PCT/EP2014/063965
§ 371 (c)(1),
(2) Date: Dec. 30, 2015

(87) PCT Pub. No.: WO2015/000901
PCT Pub. Date: Jan. 8, 2015

(65) Prior Publication Data
US 2016/0368678 A1    Dec. 22, 2016

(30) Foreign Application Priority Data
Jul. 3, 2013  (DE) .................. 10 2013 106 966

(51) Int. Cl.
*B65D 53/04* (2006.01)
*B65D 41/04* (2006.01)
(Continued)

(52) U.S. Cl.
CPC ........... *B65D 53/04* (2013.01); *B65D 41/045* (2013.01); *B65D 81/24* (2013.01); *B65D 81/266* (2013.01);
(Continued)

(58) Field of Classification Search
CPC ..................... B65D 41/045; B65D 41/0435
(Continued)

(56) References Cited

U.S. PATENT DOCUMENTS 2,020,776 A    11/1935  Goebel
3,928,109 A *  12/1975  Pollock ............... B29C 43/18
                                                  156/272.4
(Continued)

FOREIGN PATENT DOCUMENTS

DE    195 47 761    6/1997
EP    0 803 445    10/1997
(Continued)

OTHER PUBLICATIONS

Schneider, Volker; "Differenzierung, Reaktions-vermogen und Behandlung von Bocksern;" XP-002728864; May 4, 2012.

*Primary Examiner* — Jeffrey Allen
(74) *Attorney, Agent, or Firm* — Salter & Michaelson

(57) ABSTRACT

A sealing disc for a closure cap for containers, especially bottle closures for liquids fermented with yeast, consists of a plurality of layers (1, 2, 3, 4). One of these layers (4) comprises an active especially metallic substance in layered or particulate form which binds sulphur compounds in order to reduce the formation of sulphide odours after the bottle has been filled.

22 Claims, 1 Drawing Sheet

Figure 1:
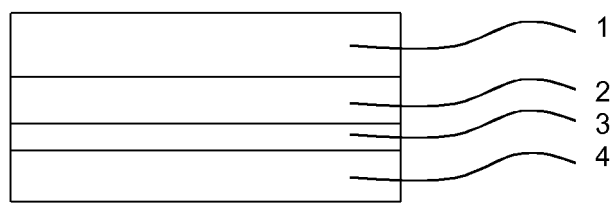

(51) Int. Cl.
*B65D 81/24* (2006.01)
*B65D 81/26* (2006.01)
*C12H 1/044* (2006.01)

(52) U.S. Cl.
CPC ......... *B65D 81/267* (2013.01); *B65D 81/268* (2013.01); *C12H 1/0408* (2013.01)

(58) Field of Classification Search
USPC .................... 215/232, 341, 347, 348, 349
See application file for complete search history.

(56) References Cited

U.S. PATENT DOCUMENTS

| | | | | |
|---|---|---|---|---|
| 4,269,321 | A * | 5/1981 | Ichinose | B32B 7/06 215/230 |
| 4,935,273 | A | 6/1990 | Ou-Yang | |
| 5,839,592 | A * | 11/1998 | Hayes | B32B 27/08 215/230 |
| 6,183,827 | B1 * | 2/2001 | Folchini | B65D 41/12 215/230 |
| 2008/0073308 | A1 * | 3/2008 | Yousif | B65D 51/18 215/232 |
| 2013/0161282 | A1 * | 6/2013 | Peck | B65B 3/02 215/341 |

FOREIGN PATENT DOCUMENTS

| | | |
|---|---|---|
| EP | 1 852 176 | 11/2007 |
| GB | 451162 | 7/1936 |
| GB | 732543 | 6/1955 |

* cited by examiner

SEALING DISK FOR A CLOSURE CAP FOR CONTAINERS, ESPECIALLY BOTTLES

TECHNICAL FIELD

The present invention relates to a sealing disc for a closure cap for containers such as bottle closures for example which is suitable, in particular, for bottles that are filled with fermented juices obtained from fruit or grapes such as fruit wines or wines.

In particular, the present invention relates to a sealing disc with which so-called sulphide odours can be absorbed.

BACKGROUND OF THE INVENTION

Sulphide odours are tainted aromas in drinks fermented with yeast especially wines which, depending upon their stage of development, remind one of putrid eggs, burnt rubber, burnt onions, sweat or the like.

The reason for the occurrence of these sulphide odours is that thiols are formed by the yeast in the course of the fermentation process. The initially formed thiols react with other constituents of the drinks to produce ever more complex sulphurous compounds which are all particularly strong smelling. It is self-evident that such foul smells are off-putting especially in wines.

A whole series of measures have been developed for eliminating sulphide odours in wines. One widely used method involves the addition of food-compatible cuprous salts such as copper sulphate for example because the copper ions are able to bind the sulphur compounds. However, such measures can only be carried out before filling the bottles.

Not infrequently however, the sulphide odours recur even after a successful treatment or they develop for the first time after the bottles have been filled. Responsible for the occurrence of the odours in these late stages are thioacetic acid esters which themselves are odorously inactive. During storage, other substances which exhibit increasingly higher odorous intensities are formed from the thioacetic acid esters in a chain reaction.

The thioacetic acid esters giving rise to the late sulphide odours do not react with copper ions. They represent an initially masked precursor stage which cannot be preventively removed by treatment with cuprous salts. Consequently, even wines which have once already been treated with cuprous salts are not protected from a fresh occurrence of such sulphide odours. The economic damage which occurs due to sulphide odours developing in the bottle, in premium wines to some extent, is substantial.

There was therefore a need for a measure with which sulphide odours could be eliminated even in wines that have already been filled into bottles.

It is self-evident that a measure of this type is not limited to wines but is equally suitable for other drinks in which there is a tendency for sulphide odours to form such as fruit wines, distillates etc. for example.

SUMMARY OF THE INVENTION

In accordance with the invention, this object is achieved in the case of a sealing disc for closure caps for containers especially bottles in which drinks are endangered by sulphide odours, wherein an active substance which can bind the sulphur compounds that cause the sulphide odours is incorporated into the sealing disc.

The sulphur compounds causing the sulphide odours are volatile substances. They rise upwardly in the bottle and collect in the hollow space between the fluid level and the closure. From there, they come into contact with the sealing disc in the closure cap and diffuse into it. They thereby come into contact with the active substance which is contained in the sealing disc and are neutralized by the active substance.

Sealing discs for closure caps for containers such as bottles typically have a laminate structure with layers that are usually of different materials which fulfil different functions in the sealing disc. The sealing discs are inserted into the closure caps for the bottles such as screw-caps for example, and have a diameter that is suited to this purpose.

The closure caps can be made of metal, frequently aluminium, or plastic.

The sealing discs serve to prevent the passage of liquid. Furthermore, sealing discs are known which prevent a gas and especially atmospheric oxygen from penetrating into the interior of the bottle from the exterior and impairing the quality of the drinks.

The sealing disc in accordance with the invention can be a compound foil which comprises two or more layers. In dependence upon the particular requirements, the layers can be formed from different materials. They can be made of plastic, metal, foamed material, paper and other materials if necessary. The sealing disc contains at least one active layer incorporating an active substance for binding or neutralizing the sulphur compounds that are causing the sulphide odours.

The production of sealing discs which are composed of a compound foil is in itself known.

Thus, the individual layers can be joined together so as to form a compound foil by a laminating process, or in dependence on the particular requirements, with the help of adhesives containing solvents or solvent-free adhesives or solvents having an aqueous basis or by means of an extrusion laminating process using adhesion promoters for example.

The active substance can be a metal, a metal alloy, a metal salt, metallic oxide or metal hydroxide or mixtures thereof which react with the sulphur compound or the sulphur compounds. Examples of these are copper, tin, silver, gold, antimony, alloys thereof, their salts including the oxides and hydroxides. The type of reaction is irrelevant as long as the sulphur compound or sulphur compounds is or are converted into a form in which the foul smell which characterizes the sulphide odours is eliminated or prevented.

Preferably, the active substance is one that is generally recognised as being safe to health and physiologically compatible.

The active substance can be introduced into one or more of the layers of which the compound foil is composed.

The active substance itself can be present in the form of one or more layers.

For example, the active substance can be applied to or worked into a plastic foil in the form of a layer. The plastic foil incorporating the active substance or active layer can be a compound foil consisting of two or more layers which could also consist of different polymers.

DETAILED DESCRIPTON

Examples of suitable polymers for the plastic foil incorporating an active substance are ethylene homopolymers such as LDPE (Low Density Polyethylene) and HDPE (High Density Polyethylene) for example or linear copolymers of ethylene with one or more α-olefins comprising e.g. 3 to 14 carbon atoms such as 1-butene, 1-hexene, 1-octene and 4-methyl-1-pentene for example. Examples of suitable copolymers are LLDPE (Linear Low Density Polyethylene)

and MDPE (Medium Density Polyethylene) as well as VLDPE (Very Low Density Polyethylene). Other suitable polymers are polypropylene, unstretched polypropylene (CPP, Cast Polypropylene), oriented polypropylene (OPP, Oriented Polypropylene), polyamide, oriented Polyamide (OPA, Oriented Polyamide) or Polyethylene terephthalate (PET).

The individual layers of the plastic foil incorporating the active substance usually have thicknesses of between 8 and 200 µm.

If a layer of metal is used as the active substance, then this can be applied to the plastic foil by means of conventional sputtering or metallization processes for example. It could also be applied to the plastic foil in the form of a metal-containing printing ink. This layer of active substance usually has a thickness of 0.5 to 30 µm.

The active substance could also be incorporated into the plastic foil in the form of metal particles.

The sealing disc in accordance with the invention preferably contains an oxygen-impermeable layer or gas barrier layer as a further layer.

The oxygen-impermeable layer fulfils a dual function. One the one hand it prevents oxygen or other gases entering the interior of the bottle. On the other hand it prevents gaseous ingredients such as alcohol for example from escaping from the interior of the bottle to the exterior through the sealing disc. That is disadvantageous on the one hand because the volatile sulphur compounds causing the sulphide odours are also retained. Nevertheless, the admission of oxygen should be prevented since this can lead to a substantial reduction in the quality of the wine.

The oxygen-impermeable layer can be a metal foil made of tin, copper or aluminium for example. It can be made of a plastic material having gas barrier properties. Examples for this are plastic foils based on polyvinyl chloride or ethylene vinyl alcohol copolymer (EVOH).

In order not to prevent the sulphur compounds from coming into contact with the active substance, the gas barrier layer should be provided in the sealing disc on the side of the layer incorporating the active substance which is remote from the interior of the bottle.

In accordance with one embodiment, the layer incorporating the active substance can simultaneously function as an oxygen-impermeable layer. For example, when it is a layer consisting of a material which functions as an active substance that binds sulphur compounds in accordance with the invention and in addition is impermeable to oxygen. An example is copper.

Preferably, the sealing disc comprises a further layer consisting of a polymer foamed material. The polymer foamed material can be polyethylene foamed material or polypropylene foamed material. The layer of foamed material usually forms the highest layer, i.e. the top layer of the layered structure of the sealing disc and is generally of greater thickness than any of the other layers. The sealing disc is advantageously covered on the side of its highest layer of foamed material by a closure cap or a screw-type cap.

The sealing disc can either be inserted into the closure cap or be fixed in some other way onto the rim of the container before sealing the closure, for example, before screwing on a screw-type cap. For example, it could also be firstly placed on the opening in the neck of a bottle and the closure then pushed over it upside down. Due to the sealing action such as screwing down, encapsulating or fixing the closure onto the bottle neck in some other way, a load in the form of a compressive load is applied at the same time. Consequently, the sealing disc is compressed and reduced in thickness.

By virtue of the compressive force, the foamed material layer provides the appropriate clamping pressure and thus the sealing effect.

Due to the thickness of the layer of foamed material and its flexible nature, tolerances in the closures and the bottle necks can be compensated. Thus, for example, any fluid (even in vaporous form) that could penetrate into the bottle from the exterior is also prevented from penetrating into it.

In addition, the foamed material layer of the sealing disc lends stability and particularly good ease of operation due to its greater thickness compared with the other layers.

In addition to the already specified layers, further layers can be provided. They can be active layers which extend the lifetime of the drink or retain its condition or even improve it.

Sealing discs which can protect the drink from oxygen enclosed in the container are advantageous for drinks such as wines for example which react with oxygen. To this end, an oxygen-absorbing layer can be provided as a further active layer.

If required, a paper layer can also be provided. A paper layer between the layer of foamed material and the underlying layer improves the adhesion between these layers and increases the sealing effect.

The invention will be described in more detail hereinafter with the aid of examples of sealing discs in accordance with the invention—partly with reference to the accompanying Figures. The layered structure is described from top to bottom (in the direction of the interior of the bottle) in the examples.

1st EXAMPLE

The sealing disc is constructed from top to bottom of a first layer consisting of foamed material, a second layer of paper, a gas barrier layer as the third layer and also a polymer foil incorporating an active layer.

The individual layers can be connected to one another by adhesive layers as is usual for the production of layered laminates of this type.

The first layer of foamed material can be formed of polyethylene or polypropylene foamed material having a density of 80 to 500 g/m$^3$ and a thickness of 0.2 to 4 mm.

A second layer of paper, 60 g paper for example, is provided below the first layer.

A gas barrier layer is arranged below the paper layer. The gas barrier layer can be a metal foil e.g. of tin, aluminium or copper or a gas-impermeable plastic based on polyvinyl chloride for example. The thickness of the gas barrier is 10 to 30 µm for example. This comparatively small thickness for the gas barrier layer is enough for deploying the blocking effect with regard in particular to preventing the entry of gaseous oxygen and for the gaseous alcohol.

A polymer foil incorporating an active layer is provided below. The active layer is formed of an active substance which reacts with the sulphur compounds causing the sulphide odours and removes them from the interior of the bottle in this way whereby the typical foul sulphide stench disappears. In this example, the active layer is formed of copper. The copper is applied to a polyethylene foil. The polyethylene foil forms the lowest layer in this embodiment of a sealing disc in accordance with the invention.

2nd EXAMPLE

FIG. 1 shows the layered structure of an embodiment of a sealing disc in accordance with the invention comprising a highest layer 1 of polyethylene foamed material having a thickness of 1.9 mm and a density of 250 kg/m$^3$, a layer 2 of 60 g/m$^2$ paper, an active layer 3 which is arranged below the paper layer 2 and consists of tin or copper having a thickness of 20 µm, and also a layer 4 of polyethylene foil having a thickness of 50 µm which forms the lowest layer of the layered structure, i.e. the layer which directly faces the interior of the bottle.

In particular, if the active layer 3 is formed of copper it can fulfil the function of an oxygen barrier layer at the same time.

3rd EXAMPLE

Figure 2:
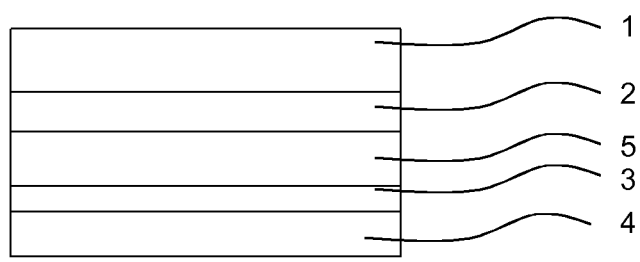

FIG. 2 shows a further embodiment of a layered structure of a sealing disc in accordance with the invention.

Here too, the highest layer 1 is formed of a polyethylene foamed material having a density of 250 kg/m$^3$ and a thickness of 1.9 mm. A paper layer 2 made of 60 g/m$^2$ paper is arranged below. The underlying layer 5 is an oxygen barrier layer consisting of aluminium having a thickness of 15 µm. Functioning as an active layer here, there is a composite of copper lacquer 3 which is applied to a polyethylene foil 4, wherein the polyethylene foil has a thickness of 50 µm and the copper lacquer is applied at a rate of 3 g/m$^2$.

It should be noted that the layer thicknesses shown in FIGS. 1 and 2 are not true to scale.

All the layers fully cover the lower surface of the layer arranged above it.

The sealing disc is either inserted beforehand into a prefabricated closure cap and fixed and clamped therein. All the layers of the sealing disc are then already adhering to one another. The closure cap is additionally loaded when encapsulating or otherwise fixing it onto the neck of the bottle neck. The sealing disc located in the closure is thereby compressed. The interior of the bottle is thereby hermetically sealed by means of the sealing disc and the closure cap. The sealing discs are not only usable in closures for wine bottles or other alcoholic drinks, but are of advantage wherever sulphur compounds corresponding to sulphide odours are formed in the interior of a container.

What is claimed is:

1. A sealing disc, in combination with and for use with a container having a closure cap for engagement with a neck of the container:
   said container for a liquid fermented with yeast;
   said sealing disc including a layered structure that is arranged in a positional sequence from a position within the closure to a position of the neck of the container;
   said layered structure being comprised of multiple juxtapositioned layers all of the same diameter, devoid of tabs and comprised of:
   a top layer of a polymer foamed material arranged for contact at the closure cap;
   an intermediate support layer below the top layer;
   an active layer; and
   a plastic foil;
   said active layer being applied to the plastic foil and disposed below the intermediate layer;
   wherein the plastic foil is made from a polymer selected from ethylene homopolymers, linear copolymers of ethylene with one or more of α-olefines comprising 3 to 14 carbon atoms, polypropylene, unstretched polypropylene, oriented polypropylene, polyamide, oriented polyamide and polyethylene terephthalate;
   wherein the plastic foil forms the lowest layer of the layered structure;
   and wherein the active layer includes an active substance which binds sulfur compounds, is arranged below the intermediate support layer, and includes at least one of a metal, a metal alloy, a metal salt, a metallic oxide, a metal hydroxide or mixtures thereof which react with the sulfur compounds.

2. The combination of claim 1, further including an oxygen-impermeable layer that is disposed between the intermediate support layer and the active layer.

3. The combination of claim 1, wherein the intermediate support layer includes a paper layer.

4. The combination of claim 1, wherein the plastic foil includes a polyethylene layer.

5. The combination of claim 1, wherein the intermediate support layer includes a paper layer, and further including an oxygen-impermeable layer that is disposed between the paper layer and the active layer.

6. The combination of claim 5, wherein the plastic foil includes a polyethylene layer.

7. The combination of claim 1,
characterized
in that the active substance is a metal selected from copper, tin, silver, gold, antimony, alloys thereof, salts thereof including the oxides and hydroxides.

8. The combination of claim 1,
characterized
in that the plastic foil is a compound foil consisting of two or more polymer layers.

9. The combination of claim 1,
wherein the plastic foil is a polymer foil and the active substance is applied to the polymer foil on the side of the polymer foil to be directed away from the content of the container.

10. The combination of claim 8,
characterized
in that at least one layer of the compound foil is formed of the active substance.

11. The combination of claim 8,
characterized
in that the active substance is integrated into at least one layer of the compound foil.

12. The combination of claim 1,
characterized
in that there is additionally provided an oxygen-impermeable layer which is arranged in the sealing disc above the side of the layer incorporating the active substance that is remote from the content of the container.

13. The combination of claim 1,
characterized
in that the active substance is applied to the plastic foil in the form of a metal-containing printing ink.

14. The combination of claim 1, wherein the container is a bottle and the closure cap is a bottle closure.

15. The combination of claim 14, wherein the bottle is a wine bottle.

16. The combination of claim 1,
characterized
in that the top layer has a thickness that is substantially greater than the thickness of any other layers of the multiple juxtapositioned layers.

17. The combination of claim 16,
characterized
in that there is additionally provided an oxygen-impermeable layer which is arranged in the sealing disc above the side of the layer incorporating the active substance that is remote from the content of the container.

18. A sealing disk in accordance with claim 16, wherein a sealing action occurs such as by screwing down, encapsulating or fixing the closure onto the bottle neck, thus providing a load in the form of a compressive load that is applied at the same time, consequently, the sealing disc is compressed and reduced in thickness, and by virtue of the compressive load, the foamed material top layer provides a clamping pressure and thus the sealing effect.

19. A sealing disk in accordance with claim 18, wherein the top layer has a thickness on the order of an order of magnitude greater than the thickness of any other layers of the multiple juxtapositioned layers.

20. A sealing disk in accordance with claim 18, wherein the top layer has a thickness on the order of millimeters and any other layers have a thickness on the order of microns or mils.

21. A sealing disc, in combination with and for use with a container having a closure cap for engagement with a neck of the container:
   said container for a liquid fermented with yeast;
   said sealing disc including a layered structure that is arranged in a positional sequence from a position within the closure to a position of the neck of the container;
   said layered structure being comprised of multiple juxtapositioned layers devoid of tabs and consisting of:
   a top layer of a polymer foamed material arranged for contact at the closure cap;
   an intermediate support layer below the top layer;
   an active layer; and
   a plastic foil;
   said active layer being applied to the plastic foil and disposed below the intermediate layer;
   wherein the plastic foil is made from a polymer selected from ethylene homopolymers, linear copolymers of ethylene with one or more of α-olefines comprising 3 to 14 carbon atoms, polypropylene, unstretched polypropylene, oriented polypropylene, polyamide, oriented polyamide and polyethylene terephthalate;
   wherein the plastic foil forms the lowest layer of the layered structure;
   and wherein the active layer includes an active substance which binds sulfur compounds, is arranged below the intermediate support layer, and includes at least one of a metal, a metal alloy, a metal salt, a metallic oxide, a metal hydroxide or mixtures thereof which react with the sulfur compounds.

22. A sealing disc, in combination with and for use with a container having a closure cap for engagement with a neck of the container:
   said container for a liquid fermented with yeast;
   said sealing disc including a layered structure that is arranged in a positional sequence from a position within the closure to a position of the neck of the container;
   said layered structure being comprised of multiple juxtapositioned layers devoid of tabs and consisting of:
   a top layer of a polymer foamed material arranged for contact at the closure cap;
   an intermediate support layer below the top layer;
   an active layer;
   a plastic foil;
   said active layer being applied to the plastic foil and disposed below the intermediate layer;
   wherein the plastic foil is made from a polymer selected from ethylene homopolymers, linear copolymers of ethylene with one or more of α-olefines comprising 3 to 14 carbon atoms, polypropylene, unstretched polypropylene, oriented polypropylene, polyamide, oriented polyamide and polyethylene terephthalate;
   wherein the plastic foil forms the lowest layer of the layered structure;
   and wherein the active layer includes an active substance which binds sulfur compounds, is arranged below the intermediate support layer, and includes at least one of a metal, a metal alloy, a metal salt, a metallic oxide, a metal hydroxide or mixtures thereof which react with the sulfur compounds;
   and an oxygen-impermeable layer that is disposed between the intermediate support layer and the active layer.

* * * * *